US010514005B2

(12) United States Patent
Luschek et al.

(10) Patent No.: US 10,514,005 B2
(45) Date of Patent: Dec. 24, 2019

(54) TURBINE ENGINE THERMAL SEAL

(71) Applicant: UNISON INDUSTRIES, LLC, Jacksonville, FL (US)

(72) Inventors: Bernard Albert Luschek, Lebanon, OH (US); David William Millward, Washington Township, OH (US); Joseph Richard Schmitt, Springfield, OH (US); Daniel Scott McCann, Centerville, OH (US); Derek Thomas Dreischarf, Bellbrook, OH (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 353 days.

(21) Appl. No.: 15/441,888

(22) Filed: Feb. 24, 2017

(65) Prior Publication Data

US 2018/0320549 A1   Nov. 8, 2018

(51) Int. Cl.
| | |
|---|---|
| *F02K 3/115* | (2006.01) |
| *F02K 3/06* | (2006.01) |
| *F01D 11/00* | (2006.01) |
| *F02C 7/18* | (2006.01) |
| *F02C 7/28* | (2006.01) |

(52) U.S. Cl.
CPC .............. *F02K 3/06* (2013.01); *F01D 11/005* (2013.01); *F02C 7/18* (2013.01); *F02C 7/28* (2013.01); *F02K 3/115* (2013.01); *F05D 2220/323* (2013.01); *F05D 2240/55* (2013.01); *F05D 2260/213* (2013.01); *Y02T 50/675* (2013.01)

(58) Field of Classification Search
CPC .... F02K 3/06; F02K 3/115; F02C 7/18; F02C 7/28; F02C 7/12; F01D 11/005; F01D 25/14; F01D 25/18; F01D 25/183
See application file for complete search history.

(56) References Cited

U.S. PATENT DOCUMENTS

| | | | |
|---|---|---|---|
| 5,492,343 A | 2/1996 | Smith et al. | |
| 8,510,945 B2* | 8/2013 | Hand | F02K 1/822 29/889.2 |
| 9,200,570 B2 | 12/2015 | Alecu | |
| 2008/0053060 A1* | 3/2008 | Olver | F02C 7/14 60/226.1 |

(Continued)

FOREIGN PATENT DOCUMENTS

| | | |
|---|---|---|
| EP | 2226473 A2 | 9/2010 |
| EP | 2339144 A2 | 6/2011 |

(Continued)

OTHER PUBLICATIONS

Japanese Office Action for Counterpart JP2018-026598, dated May 7, 2019.

(Continued)

*Primary Examiner* — Woody A Lee, Jr.
*Assistant Examiner* — Sabbir Hasan
(74) *Attorney, Agent, or Firm* — McGarry Bair PC (57) ABSTRACT

A turbine engine with a casing including opposing surfaces and a manifold opening passing through the surfaces. A surface cooler is provided adjacent one of the surfaces. A cooler manifold passes through the manifold opening. A seal is provided between the surface cooler and the casing. At least one bolt is used to secure the surface cooler to the casing with the seal in between.

23 Claims, 8 Drawing Sheets

(56) References Cited

U.S. PATENT DOCUMENTS

| | | |
|---|---|---|
| 2010/0278642 A1 | 11/2010 | Olver |
| 2012/0285138 A1 | 11/2012 | Todorovic |
| 2013/0011246 A1 | 1/2013 | Todorovic |
| 2015/0132726 A1 | 5/2015 | Hundley, Jr. et al. |
| 2016/0131039 A1 | 5/2016 | Meyst et al. |
| 2016/0376906 A1 | 12/2016 | O'Leary et al. |
| 2017/0335863 A1 | 11/2017 | Dreischarf et al. |

FOREIGN PATENT DOCUMENTS

| | | |
|---|---|---|
| EP | 3121431 A1 | 1/2017 |
| JP | S6372992 A | 4/1988 |
| JP | H04122864 U | 11/1992 |
| JP | H0849597 A | 2/1996 |
| JP | H09014448 A | 1/1997 |
| JP | 2001182615 A | 7/2001 |
| JP | 2001271935 A | 10/2001 |
| JP | 2008144752 A | 6/2008 |
| JP | 2010513809 A | 4/2010 |
| JP | 2011149420 A | 8/2011 |
| JP | 2011236894 A | 11/2011 |
| JP | 2014034975 A | 2/2014 |
| JP | 2014111930 A | 6/2014 |
| JP | 2017025917 A | 2/2017 |
| JP | 2003503646 A | 8/2018 |

OTHER PUBLICATIONS

Canadian Office Action issued in related Canadian Patent Application No. 2,995,262, 5 pages, dated Dec. 10, 2018, Canada.

Franz Kreissl, Extended European Search Report issued in related European Patent Application No. 18158440, 8 pages, Jul. 3, 2018, The Hague, Munich, Germany.

\* cited by examiner

TURBINE ENGINE THERMAL SEAL

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be continuously or discretely arranged in a ring about a portion of the engine.

One type of heat exchanger used is a surface cooler that is mounted to an aft fan casing. However, the space in this region of the engine is limited and current designs utilize nearly all the available space. As a result, newer engine technologies, which have more heat that must be dissipated, will be thermally constrained due to the lack of space available. The problem is further exacerbated in that new engine designs are becoming further space constrained, making the size and weight of the current types of coolers and their mounting systems prohibitive.

BRIEF DESCRIPTION OF THE INVENTION

In one aspect an embodiment of the invention relates to a turbine engine comprising a casing having opposing first and second surfaces, with a first manifold opening passing through the first and second surfaces, a surface cooler adjacent the first surface to define an intervening gap and having a manifold passing through the manifold opening, and a thermal seal circumscribing the manifold opening and having a bulb received within the gap.

In another aspect an embodiment of the invention relates to a casing assembly comprising opposing first and second surfaces, with a first manifold opening passing through the first and second surfaces, a surface cooler adjacent the first surface to define an intervening gap and having a manifold passing through the manifold opening, and a thermal seal circumscribing the manifold opening and having a bulb received within the gap.

In yet another aspect an embodiment of the invention relates to a method of forming a thermal seal between a first surface of a casing and a surface cooler located on the first surface, the method comprising compressively retaining a bulb of a thermal seal between a scalloped portion of the surface cooler and the first surface.

DESCRIPTION OF EMBODIMENTS OF THE INVENTION

Embodiment disclosed herein relate to surface coolers and more particularly to a thermal seal at a manifold of the surface cooler in an engine such as an aircraft engine. The thermal seal is illustrated with respect to a surface cooler, however the thermal seal can be used to seal other manifolds in engine components other than a surface cooler. Further, the term "surface coolers" as used herein can be used interchangeably with the term "heat exchangers." As used herein, the thermal seal is applicable to various types of applications such as, but not limited to, turbojets, turbo fans, turbo propulsion engines, aircraft engines, gas turbines, steam turbines, wind turbines, and water turbines.

Figure 1:
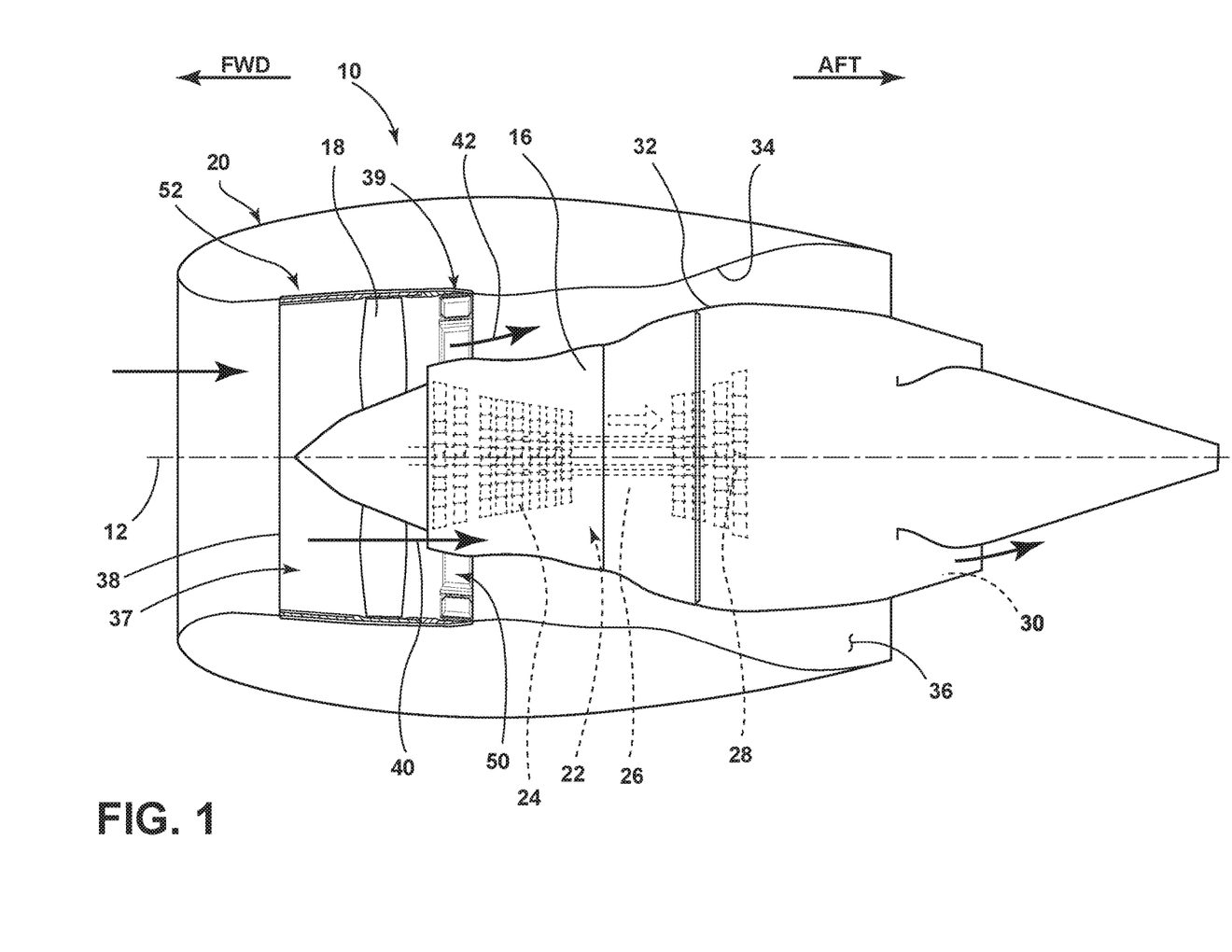
FIG. 1 is a schematic partially cut away view of a turbine engine assembly with a surface cooler and mounting system according to an embodiment of the invention.

Thus, referring to FIG. 1, a brief explanation of the environment in which embodiments of the invention can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing assembly 37 having an annular forward casing 38 and an aft casing 39 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

The turbine engine assembly 10 can pose unique thermal management challenges and a heat exchanger system or surface cooler 50 can be attached to the turbine engine assembly 10 to aid in the dissipation of heat. In the exemplary embodiment, the surface cooler 50 can be an annular fan surface cooler 50 that can be operably coupled to a casing 52 having a peripheral wall 54 (FIG. 2) that forms an interior portion of the outer cowl 34. The casing 52, in non-limiting examples, can be the fan casing assembly 37, or the forward casing 38 or aft casing 39. It should be appreciated that the casing 52 can be any casing region, such that the casing encloses any structural hardware that is part of the annular duct defined by the casing assembly 52. Thus, the surface cooler 50 can couple to the casing 52 at any position along the duct defined by the fan casing assembly 37.

Figure 2:
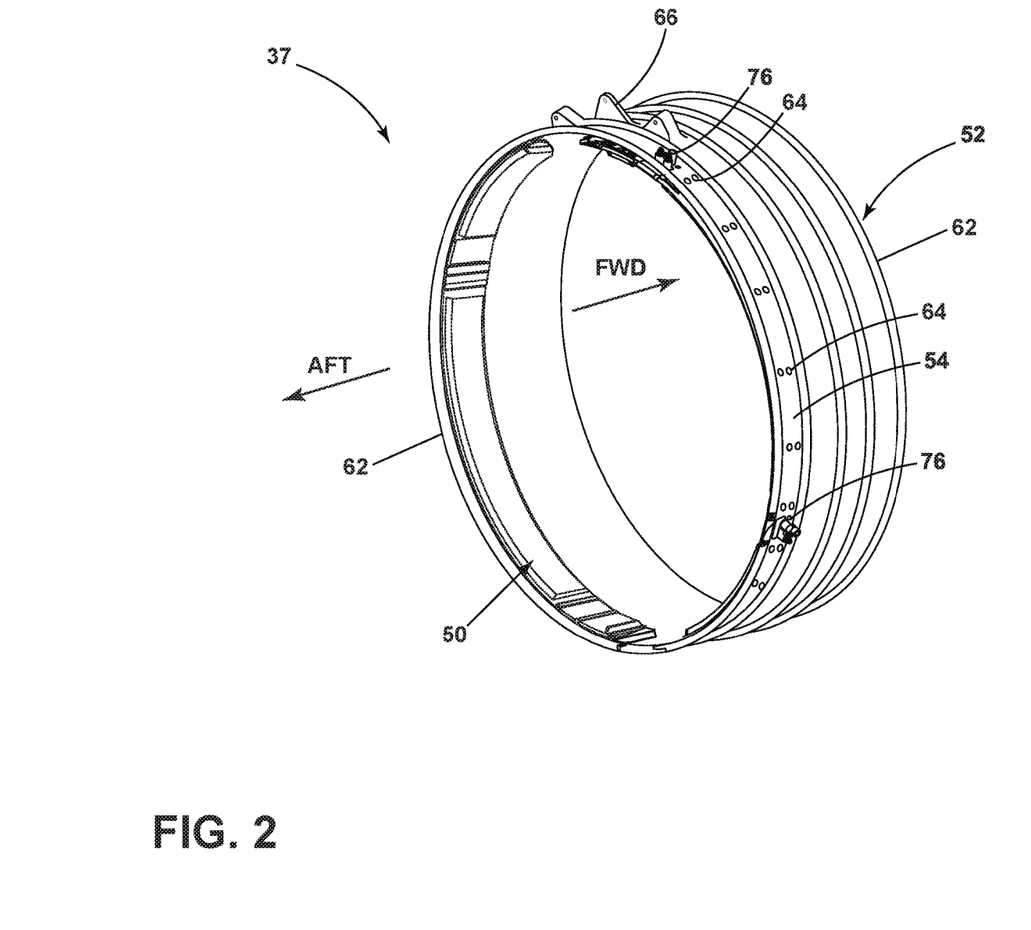
FIG. 2 is a perspective view of an aft portion of a casing, the surface cooler, and mounts that can be included in the turbine engine assembly of FIG. 1.

FIG. 2 illustrates one exemplary casing 52 of the fan casing assembly 37. The surface cooler 50 can cover any portion of the peripheral wall 54, and is not limited to the size as illustrated. It will be understood that a set of surface coolers 50 can be utilized to cool a single turbine engine assembly 10. It will be understood that "a set" as used herein can include any number including only one. Such a set can be disposed in axial arrangement along the peripheral wall 54.

The casing 52 includes a forward edge 60 and an opposing aft edge 62. The casing 52 further includes opposing first and second surfaces 48, 58, where the first surface 48 is a radially inner surface and the second surface 58 is a radially outer surface of the peripheral wall 54. Fan casing fastener openings 64 pass through the peripheral wall 54 as do first manifold openings 76. Multiple casing mounts 66 can mount along the exterior of the casing 52 for mounting the casing 52 to the outer cowl 34. Such casing mounts 66 can include, but are not limited to, clevis mounts.

The surface cooler 50 can include, but is not limited to, an air-cooled heat exchanger that is positioned on the casing 52. While the surface cooler 50 has been illustrated as being downstream of the fan assembly 18 it is also contemplated that the surface cooler 50 can alternatively be upstream from fan assembly 18, or at any position along the outer cowl 34. As such, it will be understood that the surface cooler 50 can be positioned anywhere along the axial length of the annular passage 36. As such, the annular casing 52 and surface cooler 50 can form a portion of the fan casing assembly 37.

Figure 3:
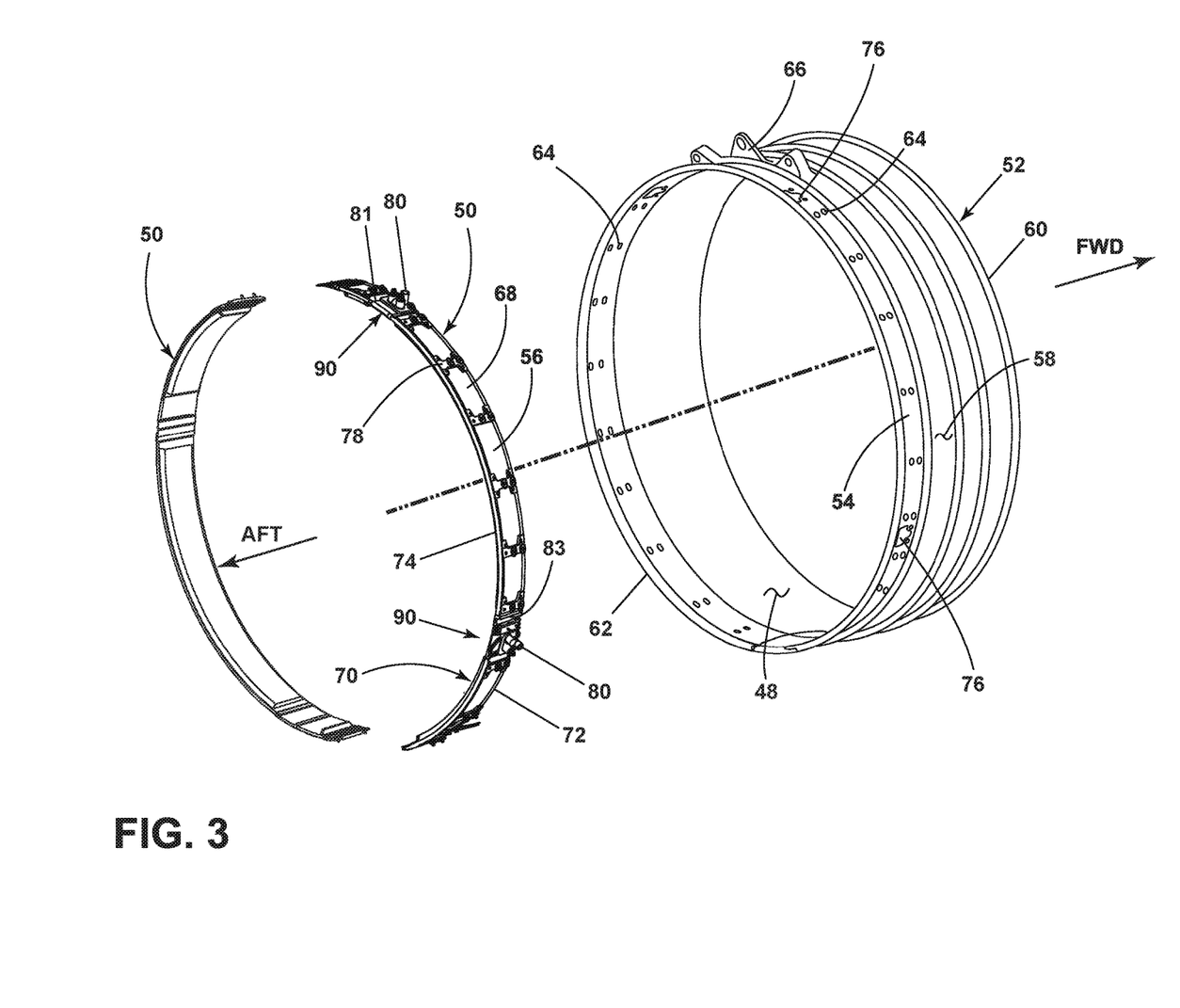
FIG. 3 is a partially exploded perspective view of the portion of the casing of FIG. 2 having two surface coolers exploded therefrom.

The partially exploded view of FIG. 3 illustrates the surface cooler 50 removed from the casing 52. The surface cooler 50 includes an outer surface 56 which can confront the peripheral wall 54. In the combined position, an interior surface 70 of the surface cooler 50 forms a portion of the outer cowl 34 (FIG. 1). The surface cooler 50 includes a first end 81 spaced from a second end 83 and having a forward edge 72 and an opposing aft edge 74. The surface cooler 50 can include a circumferential and axial annular shape that is substantially similar to the circumferential shape of the peripheral wall 54 facilitating mounting thereto.

The casing 52 further includes the fastener openings 64 and the first manifold openings 76. The surface cooler 50 includes a plurality of mount brackets 78 and cooler manifolds 80 coupled to a body 68. The cooler manifolds 80 include manifold protrusions 82, which can include but is not limited to a valve tower 82a, and two castles 82b, 82c. The fastener openings 64 and first manifold openings 76 are adapted to align with and receive, respectively, mount brackets 78 and cooler manifolds 80 mounted onto the surface cooler 50. The fastener openings 64 receive the mount brackets 78 for mounting the surface cooler 50 to the casing 52. The first manifold openings 76 receive the cooler manifolds 80 radially through the casing 52 for receiving fluid provided to the surface cooler 50. While the surface cooler 50 is shown having two cooler manifolds 80 and a plurality of mount brackets 78, any number of cooler manifolds 80 and mounting brackets 78 are contemplated. At least one connection assembly 90 includes the cooler manifolds 80 and coupling elements for coupling the surface cooler 50 to the casing 52 when assembled (FIG. 1).

Figure 4:
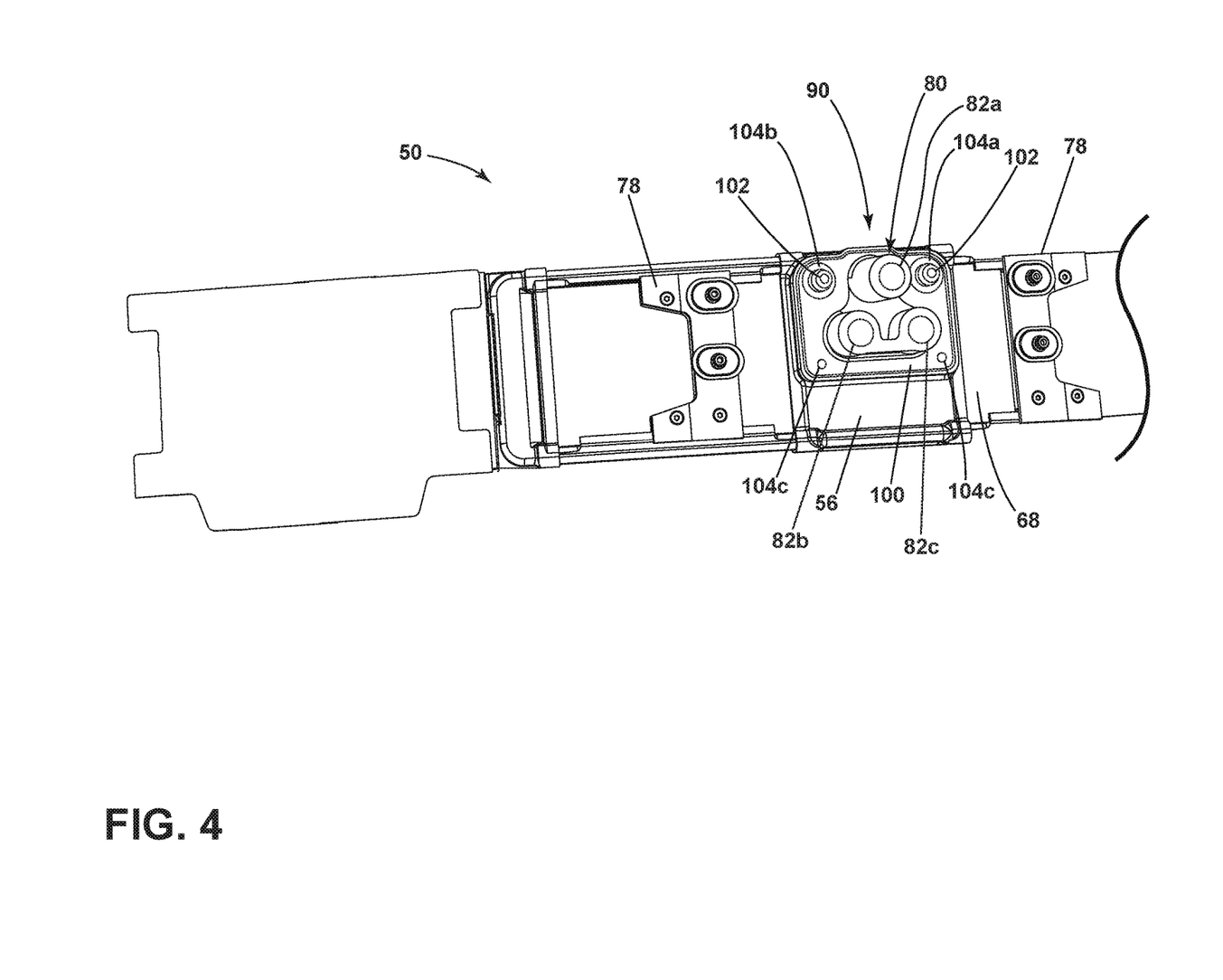
FIG. 4 is an enlarged perspective view of a portion of the surface cooler of FIG. 2 with a thermal seal.

As better shown in FIG. 4, the connection assembly 90 is positioned along the outer surface 56 of the surface cooler 50. The connection assembly 90 includes at least one receiving fastener 102. The receiving fastener 102 can be by way of non-limiting example a locating boss to couple the casing 52 (FIG. 3) to the surface cooler 50. A thermal seal 100 circumscribes the cooler manifolds 80 and abuts against at least a portion of the outer surface 56 of the surface cooler 50.

The thermal seal 100 includes at least one compression limiter 104a, illustrated as multiple compression limiters 104a, 104b, 104c. The compression limiters 104a, 104b, 104c are made with any suitable conductive material that can include, but is not limited to, a metallic material such that the compression limiters 104a, 104b, 104c are a metallic element. The compression limiters 104a, 104b, 104c are electrically conductive and can be molded with the thermal seal 100 during production. The compression limiters 104a, 104b, 104c, fan case 52, along with a bolt washer 120 (FIG. 7) and a bolt fastener 103a (FIG. 7) provide a compressive path to ensure the bolt 103a (FIG. 7) is always in tension.

When the fan casing assembly 37 is assembled (FIG. 2) the thermal seal 100 is compressed such that electrical conductivity is present between the surface cooler 50 and the casing 52. The extent to which the thermal seal 100 is compressed is fixed by the thickness of the compression limiters 104a, 104b, 104c.

Figure 5:
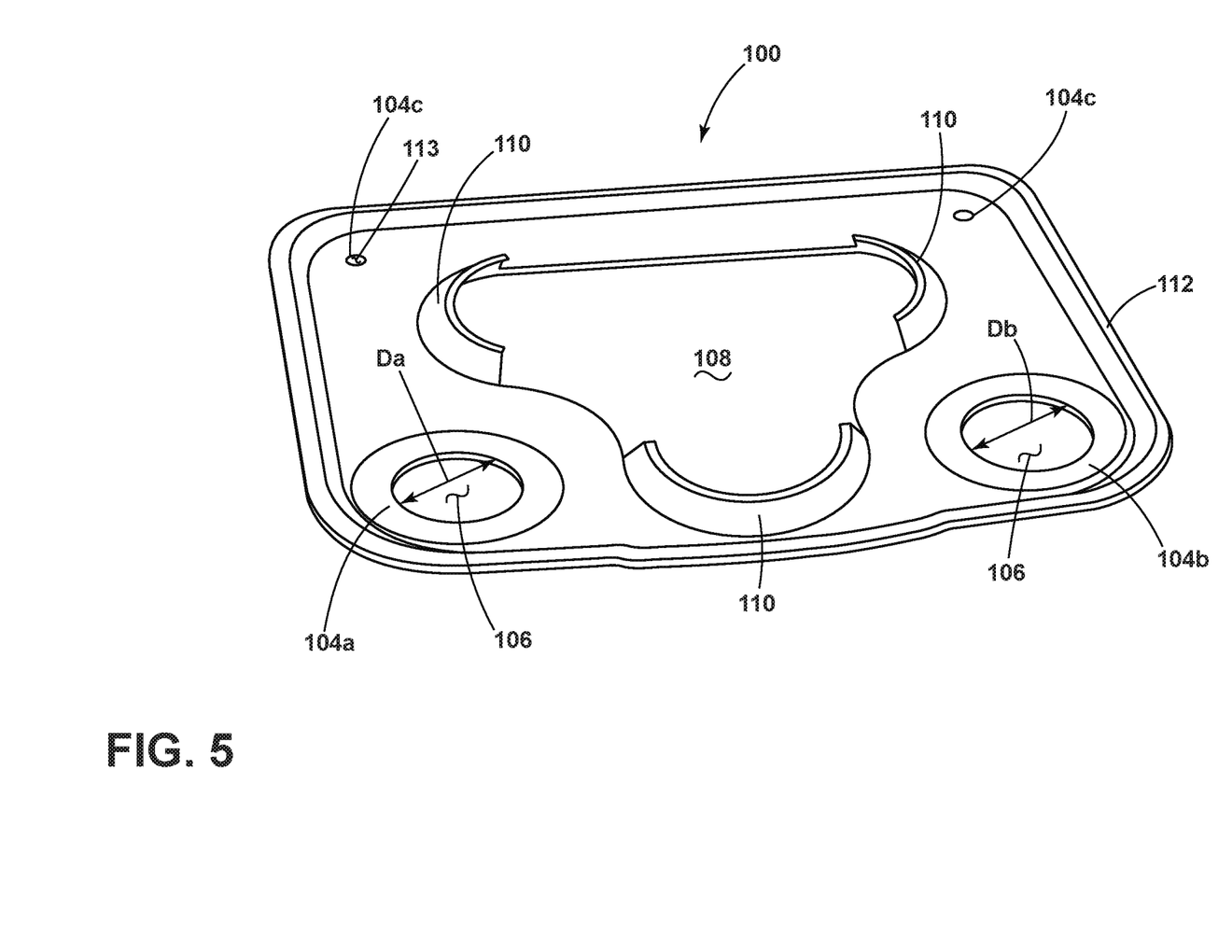
FIG. 5 is a perspective view of the thermal seal from FIG. 4.

FIG. 5 is a perspective view of the thermal seal 100. The thermal seal 100 includes at least one aperture 106 and a second manifold opening 108. The second manifold opening 108 includes fingers 110 in-molded with the thermal seal 100. The fingers 110 are a portion of the seal that are resilient and formed to bias radially outward from the thermal seal 100. A peripheral bead 112 circumscribes the thermal seal 100. The thermal seal 100, fingers 110, and peripheral bead 112 can be formed from, but not limited to, a heat resistant fabric (for example, Kevlar/fiberglass/ceramic) reinforced silicone or fluorosilicone rubber. It is also contemplated that the fingers 110 and peripheral bead 112 can be formed from a different blend of heat resistant material than other portions of the thermal seal 100.

Compression limiters 104a, 104b, and 104c are illustrated with different diameters and the same thickness. The diameters can be sized to enable one-way assembly, in one non-limiting example, to prevent the thermal seal 100 from being installed upside down. This is achieved by forming compression limiter 104a with a larger or smaller diameter than compression limiter 104b. By way of non-limiting example, a diameter Da for compression limiter 104a can be slightly larger than a diameter Db for compression limiter 104b. The diameters of each compression limiter 104a, 104b is formed to receive a corresponding receiving fastener 102 having a corresponding diameter size. The diameters can be any dimension formed to match the corresponding receiving fasteners 102. It is further contemplated that the compression limiters 104a, 104b, 104c are of any shape corresponding to the receiving fastener 102 and are not limited to circular.

A third compression limiter 104c is illustrated with a smaller diameter than the first two compression limiters 104a, 104b. The third compression limiter 104c can be formed with or without a central aperture 113. It is also contemplated that the second compression limiter 104b is a solid metallic disc having the same thickness as the first two compression limiters 104a, 104b. The compression limiters 104a, 104b, 104c can be integral with the thermal seal 100. In one non-limiting example the compression limiters 104a, 104b, 104c can be molded in place when the thermal seal 100 is manufactured.

The compression limiters 104a, 104b, 104c can allow for, by way of non-limiting example, an industry standard bolt torque for the diameter of the fastener used. The compression limiters 104a, 104b, 104c can also limit the compression such that the thermal seal 100 is located within, for example but not limited to, a radially tight location having a radial height of 0.06 in. (1.5 mm). It should be understood that the compression limiters 104a, 104b, 104c are formed with dimensions dependent on the surrounding parts. Therefore the amount of torque and the radial height to which the compression limiters 104a, 104b, 104c can be compressed can vary depending on the designed implementation of the thermal seal 100.

Figure 6:
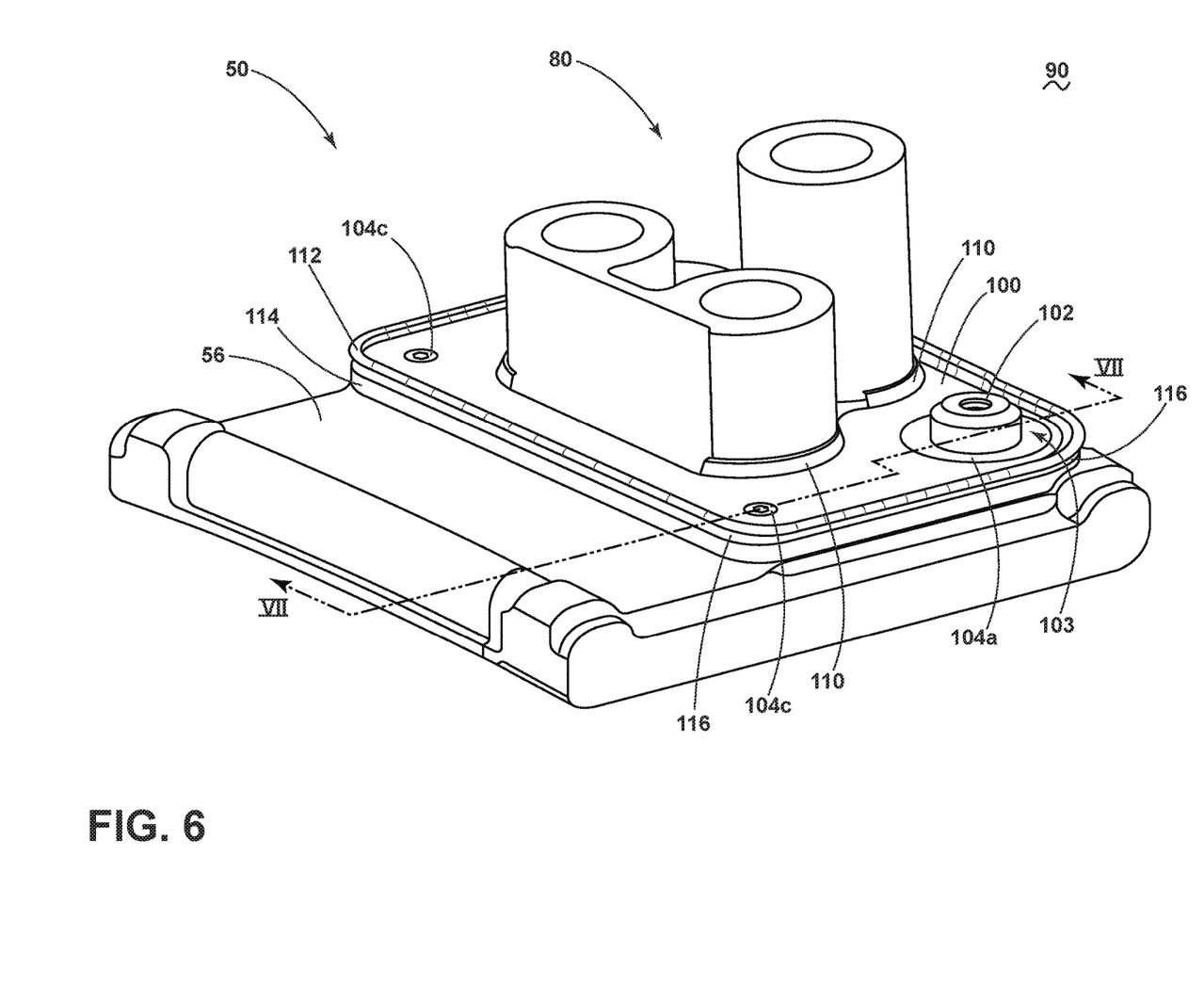
FIG. 6 is a perspective view of the surface cooler from FIG. 4.

FIG. 6 is a closer look at a perspective view of the connection assembly 90. The outer surface 56 of the surface cooler 50 includes an elevated portion 114 from which the cooler manifolds 80 and at least one receiving fastener 102 extend. A scalloped portion 116 circumscribes the elevated portion 114 and is formed in the outer surface 56. The thermal seal 100 is located on the elevated portion 114 such that the cooler manifolds 80 pass through the second manifold opening 108 and the at least one receiving fastener 102 passes through the at least one aperture 106. In the exemplary thermal seal 100 two receiving fasteners 102 pass through two apertures 106.

The thermal seal 100 slidably mounts to the outer surface 56. The fingers 110 enable the thermal seal 100 to mount with ease one way towards the surface cooler 50. When the thermal seal 100 is in place, the fingers 110 apply opposing forces to the manifold protrusions 82. In this manner, removing the thermal seal 100 from the surface cooler 50 requires more force than mounting the thermal seal 100 to the surface cooler 50.

Figure 7:
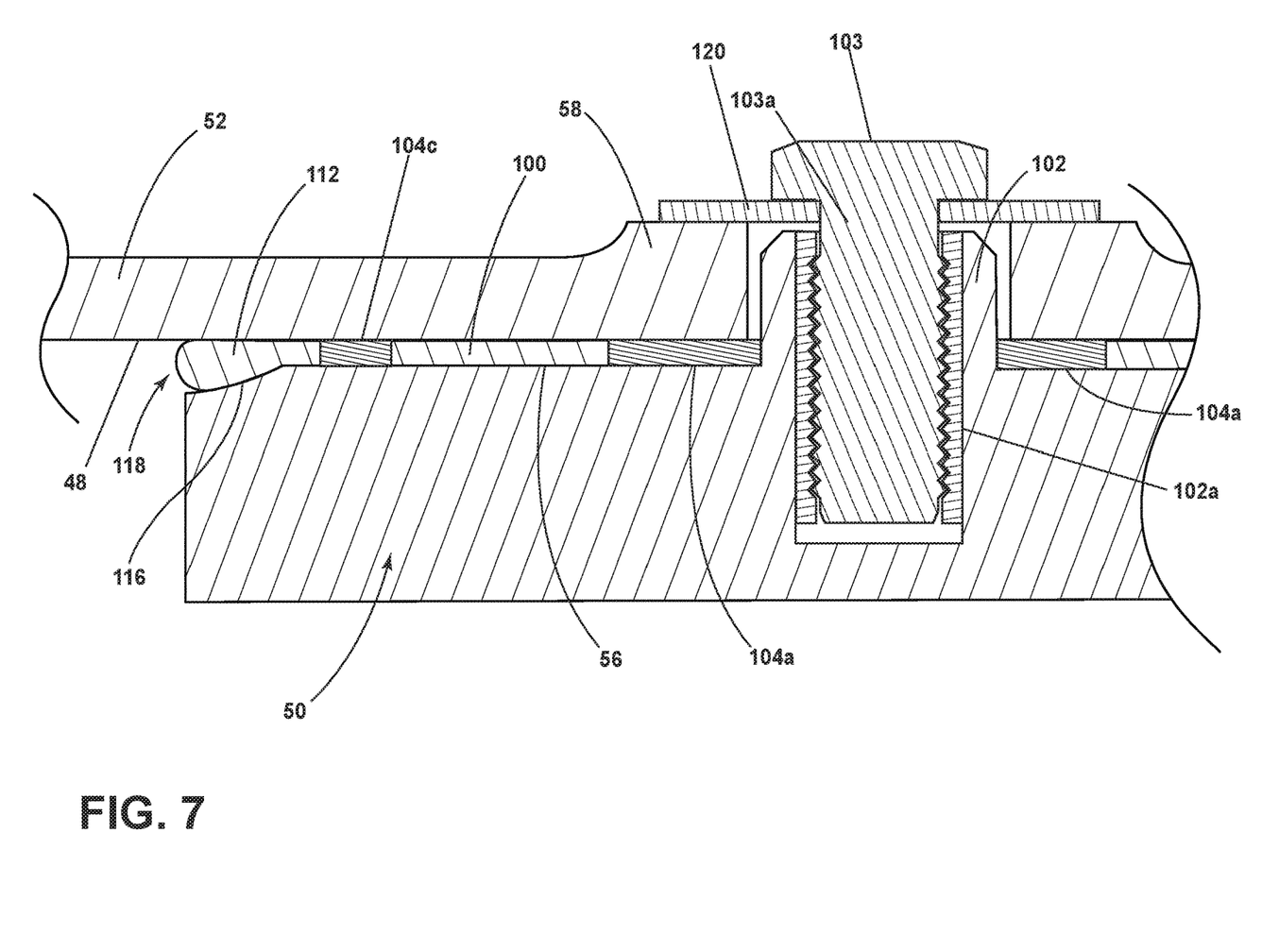
FIG. 7 is an enlarged cross-sectional view of the surface cooler of FIG. 6 in a nominal position.

Turning to FIG. 7, a portion of a cross-section taken along line VII-VII with the fan casing assembly 32 (FIG. 2) fully assembled is illustrated. As previously disclosed herein, the receiving fastener 102 can include, but is not limited to, locating bosses 102a for housing receiving fastener inserts 103. In one non-limiting example the receiving fastener insert is a threaded bolt 103a. When assembled, the thermal seal 100 is secured between the first surface 48 of the casing 52 and the outer surface 56 of the surface cooler 50. Contact between the thermal seal 100 and the first surface 48 of the casing 52 is maintained along the extent of the thermal seal 100. A gap 118 is defined between the scalloped portion 116 and the first surface 48 of the casing 52. The peripheral bead 112 is received in the gap 118. This exemplary assembly can occur by way of non-limiting example, when the fan casing assembly 37 is first assembled and gaps or spaces caused by thermal expansion have yet to develop.

Figure 8:
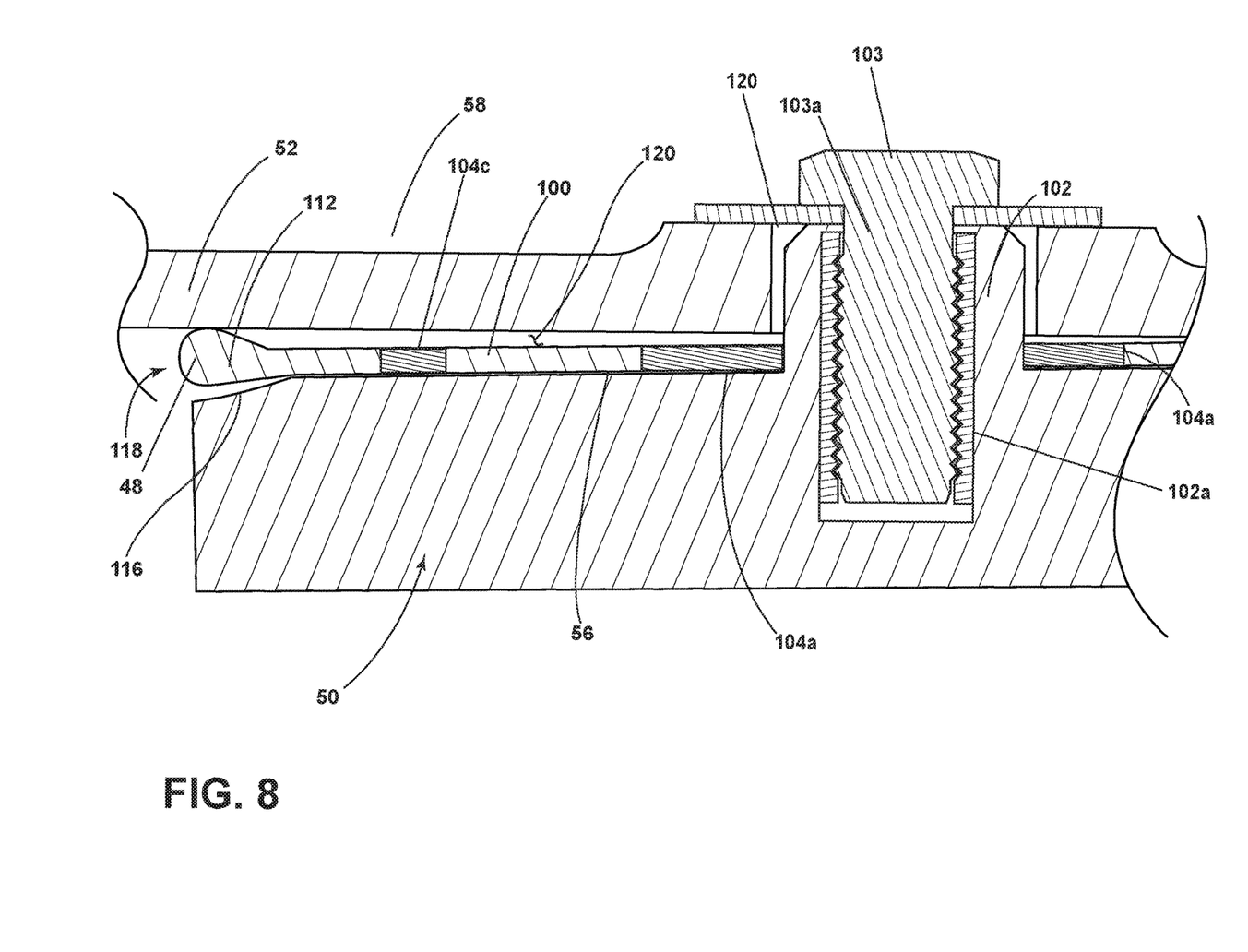
FIG. 8 is an enlarged cross-sectional view of the surface cooler of FIG. 6 in an operating position.

FIG. 8 is the same cross-section of FIG. 7 in which a space 120 exists between the first surface 48 of the casing 52 and the thermal seal 100. In one non-limiting example, FIG. 8 illustrates a portion of the fan casing assembly 37 coincident with a turbine engine 10 (FIG. 1) after some period of operation. In such conditions shifting and movement of the engine parts caused by thermal expansions and contractions can result in development of the space 120. It is further contemplated that the space 120 can exist at the initial assembly of the fan casing assembly 37 due to hardware tolerances and the curvature of the casing 52 and surface cooler 50. In the exemplary illustration, the peripheral bead 112 enables continued contact between the thermal seal 100 and the first surface 48.

It is also contemplated that the scalloped portion 116 can be located in the first surface 48 such that it circumscribes the manifold opening 108 and is sized to receive the peripheral bead 112.

A method of forming a thermal seal 100 between the first surface 48 of the casing 52 and the surface cooler 50 includes compressively retaining the peripheral bead 112 of the thermal seal 100 between the scalloped portion 116 of the surface cooler 50 and the first surface 48. The method can further include circumscribing the first manifold opening 76 with the peripheral bead 112. The method includes preventing over-compression of the thermal seal with the compression limiter 104 described herein. The conductivity of the compression limiter 104 enables establishing electrical conductivity for grounding between the casing 52 and the surface cooler 50 through the thermal seal 100.

A portion of the thermal seal 100 described herein as the fingers 110 is biased against the cooler manifold 80 in order to retain the thermal seal 100 in place. The thermal seal 100 can be removed when maintenance or damage requires replacement of the thermal seal 100. The fingers 110 produce a biasing force such that removal of the thermal seal 100 away from the surface cooler 50 requires a higher force than mounting the thermal seal 100 to the surface cooler 50.

Benefits associated with the thermal seal 100 and placement of the thermal seal as described herein include a configuration that allows for standard installation practices and procedures. With the thermal seal 100, adhesive is not required which allows for quick field replacement and quick installation in a new-make manufactured engine. Compression limiters 104a and 104b enable error proofing and offer precision control to locating the thermal seal 100.

The above-described disclosure provides for a compact and simplified design that provides a variety of additional benefits including a requirement of only two bolts 103a or fasteners 103. In the prior art, four bolts are utilized to mount the thermal seal to the surface cooler. In the thermal seal 100, the peripheral bead 112 maintains a sealed boundary between the first surface 48 and the surface cooler 50 regardless of shifting or spacing during operation or assembly. The thermal seal 100 additionally prevents the need for a complex machined interface feature for an o-ring.

This design adjustment is cost effective by decreasing number of parts required while preventing over compression by including the compression limiters 104a, 104b, 104c. Additionally the peripheral bead 112, when installed, eliminates any need for a bonding adhesive. The dimensional differences of the compression limiters 104a, 104b, 104c in particular, prevent incorrect assembly of the parts along with a quick turn-around time during assembly. Standard installation practices and procedures can be utilized for installation. Other benefits to the compression limiters 104a, 104b, 104c include electrical conductivity.

To the extent not already described, the different features and structures of the various examples can be used in combination with each other as desired. That one feature is not illustrated in all of the exemplary disclosures is not meant to be construed that it cannot be, but is done for brevity of description. Thus, the various features of the different examples can be mixed and matched as desired to form new examples, whether or not the new examples are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a casing having opposing first and second surfaces, with a first manifold opening passing through the first and second surfaces;
   a surface cooler adjacent the first surface to define an intervening gap and having a cooler manifold passing through the first manifold opening; and
   a thermal seal circumscribing the first manifold opening and having a peripheral bead received within the gap.

2. The turbine engine of claim 1 wherein one of the surface cooler and the first surface have a scalloped portion that at least partially defines the gap.

3. The turbine engine of claim 2 wherein the scalloped portion circumscribes the first manifold opening and the peripheral bead circumscribes the thermal seal.

4. The turbine engine of claim 3 wherein the peripheral bead extends about a periphery of the thermal seal.

5. The turbine engine of claim 1 wherein the thermal seal comprises a second manifold opening, aligned with the first manifold opening, and the cooler manifold passing through the first and second manifold openings.

6. The turbine engine of claim 5 wherein the thermal seal comprises fingers abutting the cooler manifold.

7. The turbine engine of claim 6 wherein the fingers apply opposing forces to the cooler manifold.

8. The turbine engine of claim 1 wherein the thermal seal comprises at least one compression limiter.

9. The turbine engine of claim 8 wherein the at least one compression limiter is multiple compression limiters structured for one-way assembly.

10. The turbine engine of claim 9 wherein the structure for one-way assembly comprises compression limiters with different dimensions.

11. The turbine engine of claim 8 wherein the at least one compression limiter is a metallic element.

12. The turbine engine of claim 11 wherein the metallic element is electrically conductive and electrically couples the casing to the surface cooler.

13. A casing assembly comprising:
    opposing first and second surfaces, with a first manifold opening passing through the first and second surfaces;
    a surface cooler adjacent the first surface to define an intervening gap and having a cooler manifold passing through the first manifold opening; and
    a thermal seal circumscribing the first manifold opening and having a peripheral bead received within the gap.

14. The casing assembly of claim 13 wherein one of the surface cooler and the first surface have a scalloped portion that at least partially defines the gap.

15. The casing assembly of claim 14 wherein the scalloped portion circumscribes the first manifold opening and the peripheral bead circumscribes the thermal seal.

16. The casing assembly of claim 15 wherein the peripheral bead extends about a periphery of the thermal seal.

17. The casing assembly of claim 13 wherein the thermal seal comprises fingers abutting the cooler manifold.

18. The casing assembly of claim 13 wherein the thermal seal comprises at least one compression limiter.

19. The casing assembly of claim 18 wherein the at least one compression limiter is multiple compression limiters with different dimensions structured for one-way assembly.

20. A method of forming a thermal seal between a first surface of a casing and a surface cooler located on the first surface, the method comprising circumscribing a first manifold opening located within and passing through the first surface of the casing with the thermal seal having a peripheral bead, and compressively retaining the peripheral bead between a scalloped portion located on the surface cooler and the first surface; wherein the peripheral bead is received within a gap defined between the scalloped portion and the first surface.

21. The method of claim 20 further comprising preventing over-compression of the thermal seal.

22. The method of claim 20 further comprising establishing electrical conductivity from the casing to the surface cooler through the thermal seal.

23. The method of claim 20 further comprising minimizing air leakage between the first surface of the casing and the surface cooler located on the first surface.

* * * * *